(12) United States Patent
Watanabe

(10) Patent No.: US 10,805,097 B2
(45) Date of Patent: Oct. 13, 2020

(54) INFORMATION PROCESSING APPARATUS, INFORMATION PROCESSING SYSTEM, AND NON-TRANSITORY COMPUTER READABLE MEDIUM

(71) Applicant: FUJI XEROX CO., LTD., Tokyo (JP)

(72) Inventor: Tsuyoshi Watanabe, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 16/546,308

(22) Filed: Aug. 21, 2019

(65) Prior Publication Data

US 2020/0267009 A1     Aug. 20, 2020

(30) Foreign Application Priority Data

Feb. 19, 2019   (JP) ................................ 2019-027282

(51) Int. Cl.
*H04L 12/14*    (2006.01)
*H04L 12/26*    (2006.01)

(52) U.S. Cl.
CPC ........ *H04L 12/1435* (2013.01); *H04L 43/062* (2013.01); *H04L 43/0823* (2013.01); *H04L 43/0876* (2013.01)

(58) Field of Classification Search
CPC ............... H04L 12/1435; H04L 43/062; H04L 43/0823; H04L 43/0876
USPC ...................................................... 455/406
See application file for complete search history.

(56) References Cited

U.S. PATENT DOCUMENTS

| | | | | |
|---|---|---|---|---|
| 2006/0106924 A1* | 5/2006 | Fukasawa | ............... | H04L 67/06 709/223 |
| 2012/0163232 A1* | 6/2012 | Yoo | ..................... | H04L 41/5025 370/253 |
| 2013/0198373 A1* | 8/2013 | Zalmanovitch | ..... | H04M 15/854 709/224 |
| 2013/0272125 A1* | 10/2013 | Espina Perez | .......... | H04L 47/12 370/230 |
| 2015/0135259 A1* | 5/2015 | Ilyadis | ................ | H04L 63/0227 726/1 |
| 2015/0268906 A1* | 9/2015 | Kamiya | ................. | G06Q 30/04 358/1.15 |
| 2018/0006961 A1* | 1/2018 | Guibene | ............... | H04W 40/04 |

FOREIGN PATENT DOCUMENTS

| | | |
|---|---|---|
| JP | 2012-221199 | 11/2012 |
| JP | 2015508632 | 3/2015 |
| WO | 2013112647 | 8/2013 |

* cited by examiner

*Primary Examiner* — William Nealon
(74) *Attorney, Agent, or Firm* — JCIPRNET

(57) ABSTRACT

An information processing apparatus includes a memory, a generation unit, and a transmission unit. The memory stores cumulative traffic in a specified period in data communication with a management apparatus. The generation unit generates data to be notified to the management apparatus. The transmission unit transmits the data generated by the generation unit to the management apparatus via a different apparatus if a sum of traffic for transmitting the data to the management apparatus and the cumulative traffic stored in the memory exceeds a predetermined upper limit.

19 Claims, 13 Drawing Sheets

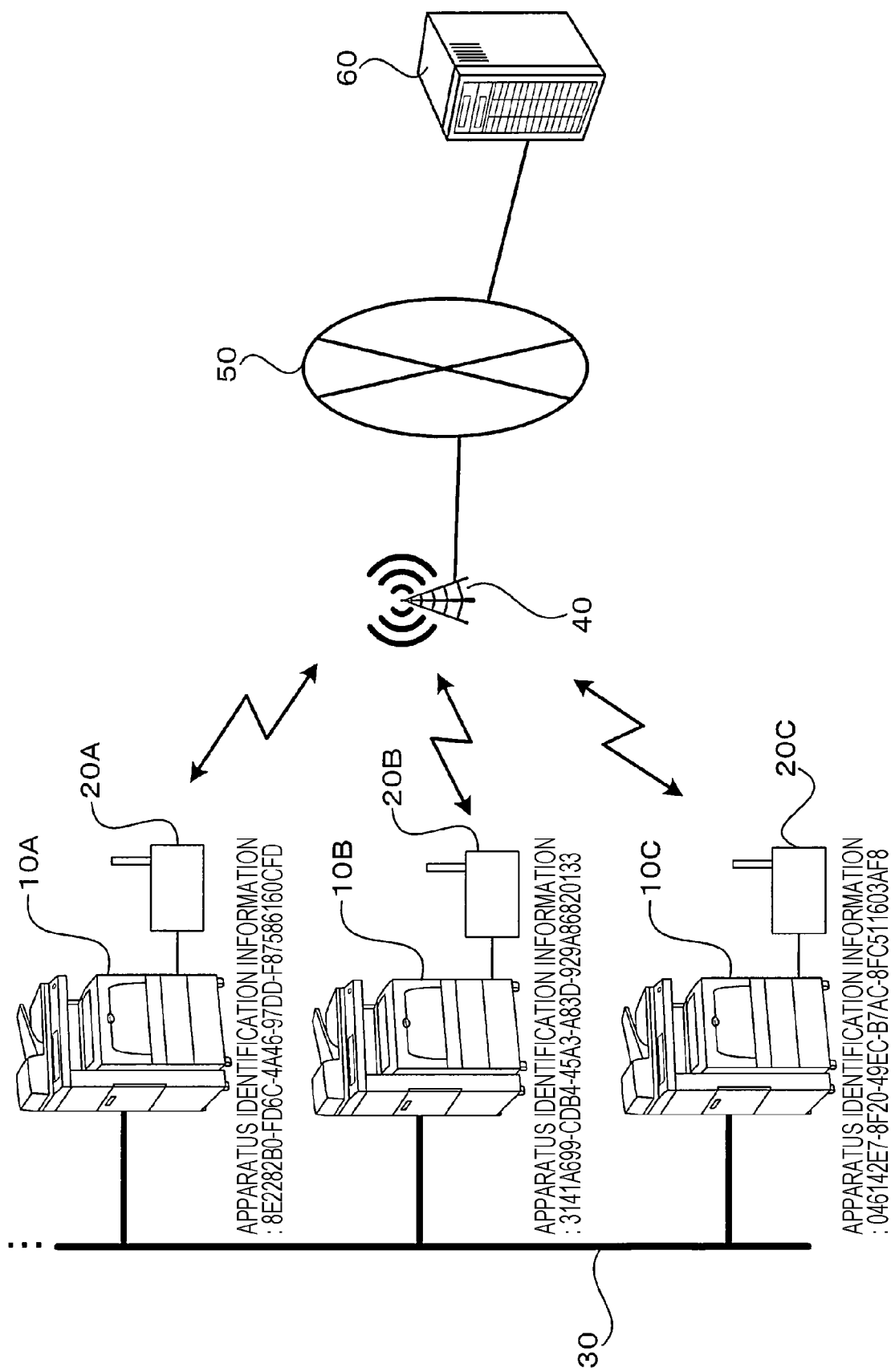

FIG. 2

| APPARATUS IDENTIFICATION INFORMATION | CLIENT IDENTIFICATION INFORMATION | MANAGEMENT INFORMATION | | | | | |
|---|---|---|---|---|---|---|---|
| | | METER COUNT INFORMATION | | MONOCHROME | TONER STATUS INFORMATION | | |
| | | COLOR | MONOCHROME | | Y | M | C | K |
| 8E2282B0-FD6C-4A46-97DD-F87586160CFD | 38A6 | 12589 | 456899 | AVAILABLE | AVAILABLE | AVAILABLE | AVAILABLE |
| 3141A699-CDB4-45A3-A83D-929A86820133 | 38A6 | 12589 | 9568 | AVAILABLE | AVAILABLE | AVAILABLE | AVAILABLE |
| 046142E7-8F20-49EC-B7AC-8FC511603AF8 | 38A6 | 8912 | 32506 | AVAILABLE | AVAILABLE | AVAILABLE | LOW |
| 58A65FE0-325A-59CD-87FC-4456E236B567 | 7C2D | 25601 | 8796358 | AVAILABLE | AVAILABLE | AVAILABLE | AVAILABLE |
| 79CD0256-8945-AA25-602A-CD0257836984 | 7C2D | 1234 | 56789 | AVAILABLE | AVAILABLE | AVAILABLE | AVAILABLE |

FIG. 3

| NOTIFICATION DATA TYPE | PLAN A | PLAN B | PLAN C |
|---|---|---|---|
| MONTHLY COMMUNICATION CHARGE | 100 YEN | 200 YEN | 300 YEN |
| MONTHLY DATA VOLUME | UP TO 10 KB | UP TO 50 KB | UP TO 100 KB |
| EXCESS-DATA COMMUNICATION CHARGE | 1 YEN/KB | 0.8 YEN/KB | 0.6 YEN/KB |

FIG. 6

| NOTIFICATION DATA TYPE | PROXY TRANSMISSION | OVER-LIMIT TRANSMISSION |
|---|---|---|
| METER COUNT INFORMATION | NOT PERMITTED | PERMITTED |
| Y TONER STATUS | PERMITTED | NOT PERMITTED |
| M TONER STATUS | PERMITTED | NOT PERMITTED |
| C TONER STATUS | PERMITTED | NOT PERMITTED |
| K TONER STATUS | PERMITTED | NOT PERMITTED |
| WASTE-TONER COLLECTION BOX STATUS | PERMITTED | NOT PERMITTED |
| ERROR OCCURRENCE STATUS | PERMITTED | PERMITTED |

FIG. 7

| NOTIFICATION DATA TYPE | ELECTRONIC SIGNATURE | PROXY TRANSMISSION | OVER-LIMIT TRANSMISSION |
|---|---|---|---|
| METER COUNT INFORMATION | NEEDED | PERMITTED | PERMITTED |
| Y TONER STATUS | NOT NEEDED | PERMITTED | NOT PERMITTED |
| M TONER STATUS | NOT NEEDED | PERMITTED | NOT PERMITTED |
| C TONER STATUS | NOT NEEDED | PERMITTED | NOT PERMITTED |
| K TONER STATUS | NOT NEEDED | PERMITTED | NOT PERMITTED |
| WASTE-TONER COLLECTION BOX STATUS | NOT NEEDED | PERMITTED | NOT PERMITTED |
| ERROR OCCURRENCE STATUS | NOT NEEDED | PERMITTED | PERMITTED |

FIG. 11

| APPARATUS IDENTIFICATION INFORMATION (16 BYTES) | NOTIFICATION DATA TYPE (2 BYTES) | NOTIFICATION DATA LENGTH (1 BYTE) | NOTIFICATION DATA (1 BYTE) |
|---|---|---|---|
| 8E2282B0-FD6C-4A46-97DD-F87586160CFD | Y TONER STATUS | 1 | LOW |

FIG. 12

| APPARATUS IDENTIFICATION INFORMATION (16 BYTES) | NOTIFICATION DATA TYPE (2 BYTES) | NOTIFICATION DATA LENGTH (1 BYTE) | APPARATUS IDENTIFICATION INFORMATION (16 BYTES) | NOTIFICATION DATA TYPE (2 BYTES) | NOTIFICATION DATA LENGTH (1 BYTE) | NOTIFICATION DATA (1 BYTE) |
|---|---|---|---|---|---|---|
| 3141A699-CDB4-45A3-A83D-929A86820133 | PROXY TRANSMISSION | 16 | 8E2282B0-FD6C-4A46-97DD-F87586160CFD | Y TONER STATUS | 1 | LOW |

NOTIFICATION DATA FROM IMAGE FORMING APPARATUS 10A

INFORMATION PROCESSING APPARATUS, INFORMATION PROCESSING SYSTEM, AND NON-TRANSITORY COMPUTER READABLE MEDIUM

CROSS-REFERENCE TO RELATED APPLICATIONS

This application is based on and claims priority under 35 USC 119 from Japanese Patent Application No. 2019-027282 filed Feb. 19, 2019.

BACKGROUND

(i) Technical Field

The present disclosure relates to an information processing apparatus, an information processing system, and a non-transitory computer readable medium.

(ii) Related Art

Japanese Unexamined Patent Application Publication No. 2012-221199 discloses a monitoring system configured as follows. A monitoring device holds information regarding an upper limit for event notification. Every time an event is notified, the monitoring device accumulates the number of notified events on a per specified-period basis. When the accumulated number of notified events reaches the event-notification limit, event notification to a management server is restrained.

Japanese Unexamined Patent Application Publication (Translation of PCT Application) No. 2015-508632 discloses a management system for a method for usage in network connection. In the management system, a mobile computer apparatus stores a data usage plan having a threshold set for network connection. Control is performed of a data transfer request from an application on the basis of the set threshold.

SUMMARY

Aspects of non-limiting embodiments of the present disclosure relate to an information processing apparatus, an information processing system, and a non-transitory computer readable medium that are enabled to restrain data transmission to be performed over the upper limit for traffic as compared to a case where generated data is transmitted without considering the upper limit.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including a memory, a generation unit, and a transmission unit. The memory stores cumulative traffic in a specified period in data communication with a management apparatus. The generation unit generates data to be notified to the management apparatus. The transmission unit transmits the data generated by the generation unit to the management apparatus via a different apparatus if a sum of traffic for transmitting the data to the management apparatus and the cumulative traffic stored in the memory exceeds a predetermined upper limit.

BRIEF DESCRIPTION OF THE DRAWINGS

An exemplary embodiment of the present disclosure will be described in detail based on the following figures, wherein:

FIG. 1 is a diagram illustrating the system configuration of a remote management system of the exemplary embodiment of the present disclosure;

FIG. 2 is a table illustrating an example of management information stored in a remote management server;

FIG. 3 is a table illustrating example charge plans of a commercial service in low power wide area (LPWA) wireless communication;

FIG. 6 is a table illustrating an example control table for notification data stored in a data memory;

FIG. 7 is a table illustrating a different example control table for notification data stored in the data memory;

FIG. 11 is a table illustrating example notification data generated by an image forming apparatus;

FIG. 12 is a table illustrating example notification data for proxy transmission generated by an image forming apparatus.

DETAILED DESCRIPTION

Figure 4:
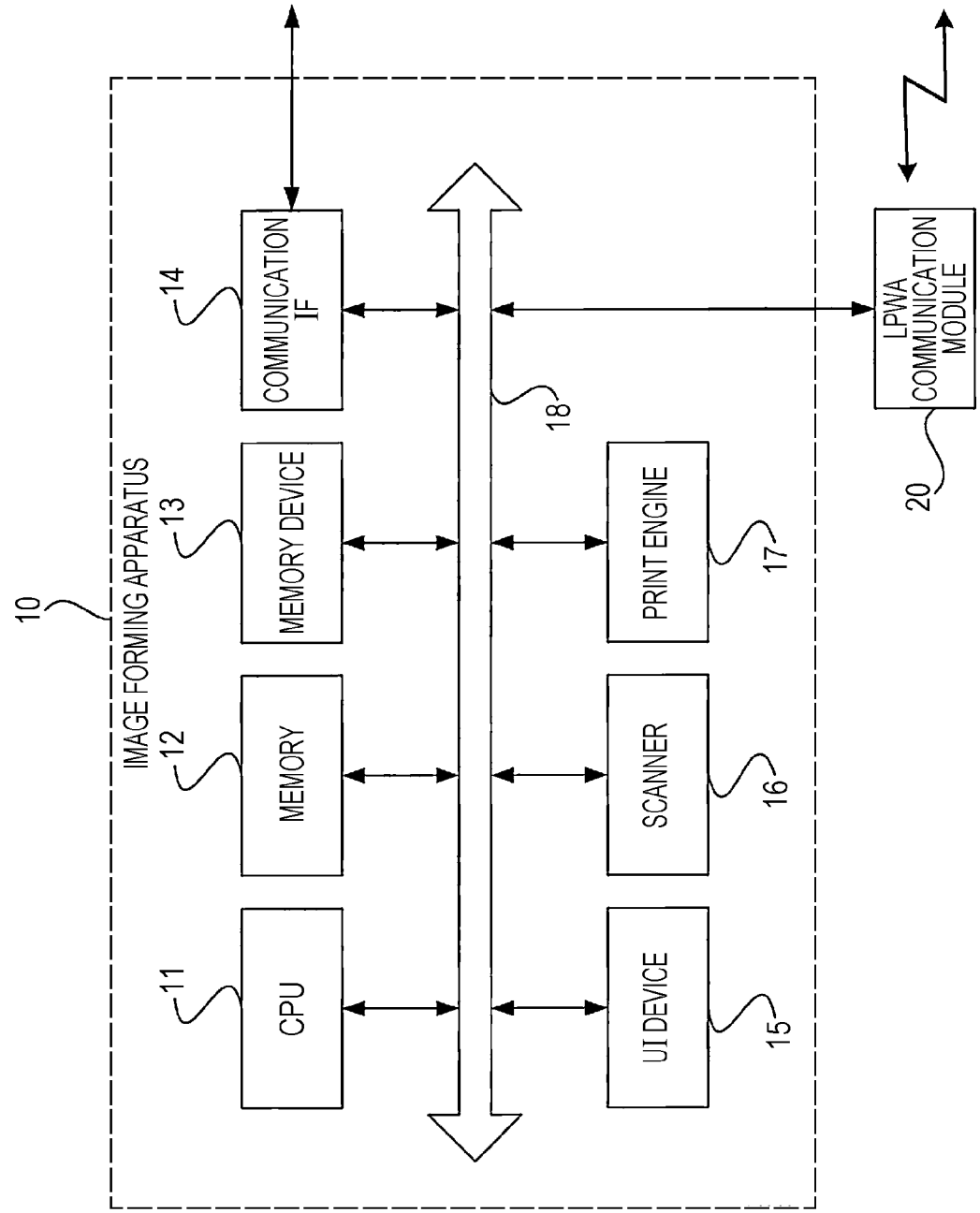
FIG. 4 is a block diagram illustrating the hardware configuration of an image forming apparatus in the exemplary embodiment of the present disclosure.

An exemplary embodiment of the present disclosure will be described in detail with reference to the drawings. FIG. 1 illustrates the system configuration of a remote management system of the exemplary embodiment of the present disclosure.

The remote management system of this exemplary embodiment has a configuration in which image forming apparatuses 10A, 10B, and 10C, LPWA communication modules 20A, 20B, and 20C respectively connected to the image forming apparatuses 10A, 10B, and 10C, and a remote management server 60 that acquires and stores management information for remotely managing the multiple image forming apparatuses 10A to 10C are connected via a base station 40 and a LPWA communication network 50.

The remote management system of this exemplary embodiment is designed to uniquely identify the image forming apparatuses 10A to 10C on the basis of respective different pieces of apparatus identification information. This exemplary embodiment will be described on the assumption that 128-bit information called universally unique identifier (UUID) is used as the apparatus identification information. However, information having combination of a product code and a serial number or information such as media access control (MAC) address may be used as the apparatus identification information, as long as the information uniquely identifies the corresponding image forming apparatus.

For easy-to-understand explanation, FIG. 1 illustrates the configuration in which only the three image forming apparatuses 10A to 10C are included in the remote management system of this exemplary embodiment; however, four or more image forming apparatuses 10 may be included.

In the remote management system of this exemplary embodiment, information regarding meter counts of the image forming apparatuses 10A to 10C installed in the office or the like of clients, information regarding the status of a supply such as toner, and management information such as failure information are acquired and managed by the remote management server 60. In such a manner as described above, maintenance work efficiency is improved, and services are provided for clients.

Specifically, such services as below are provided. A supply such as toner is automatically ordered and delivered to a client when the supply is to run short, and a service engineer goes to the office in response to a failure occurrence.

FIG. 2 illustrates an example of the management information stored in the remote management server 60. In the example of the management information illustrated in FIG. 2, management information such as the apparatus identification information, client identification information, meter count information, and toner status information is associated with a corresponding one of image forming apparatuses to be managed.

The client identification information is information that uniquely identifies a client. Specifically, in a case where one client uses multiple image forming apparatuses, the same client identification information is assigned to the multiple image forming apparatuses. The meter count information indicates a value of a cumulative total number of printed sheets and indicates how many sheets the image forming apparatus has printed in executing a printing process. FIG. 2 illustrates a case where pieces of information regarding the meter counter are classified and totaled on the basis of color printing and monochrome printing. Although FIG. 2 does not illustrate the details of the management information, the management information includes various pieces of information such as the number of times an error or paper jam occurs.

However, in recent years, a network including image forming apparatuses is separated from the Internet from the viewpoint of security in some cases, and a firewall is provided between the remote management server 60 and the image forming apparatuses in other cases. These configurations prevent connection between the remote management server 60 and the image forming apparatuses.

In such cases, if the image forming apparatuses and the remote management server 60 are connected via a mobile phone network, the management information of each image forming apparatus may be acquired and transmitted to the remote management server 60.

However, such a configuration needs subscription to a line in the mobile phone network for each image forming apparatus and involves with a high communication charge. In particular, the management information acquired from the image forming apparatus is composed of data having a small amount of data such as meter count information. It is not efficient from the viewpoint of cost to subscribe to lines in the mobile phone network only for the management information transmission.

Hence, in the remote management system of this exemplary embodiment, the management information acquired from the image forming apparatuses 10A to 10C is transmitted to the remote management server 60 via a LPWA network.

The LPWA network is also abbreviated as LPWAN and is a wireless communication network in which it is not possible to perform high speed communication but is possible to transmit and receive data with low power consumption in a wide area.

Commercial services with the LPWA wireless communication network are provided in recent years, and various plans with lower communication charges than those for the subscription to lines in the mobile phone network are provided.

For example, FIG. 3 illustrates an example of charge plans of the commercial services of the LPWA wireless communication as described above. For example, Plan A as a charge plan illustrated in FIG. 3 is designed as follows. Monthly traffic up to a monthly data amount of 10 kilobytes (KB) costs 100 yen. Data traffic in excess of the upper limit costs 1 yen/KB, and the excess data amount is thus charged on the basis of a meter count. This exemplary embodiment is described by using a case where a line is subscribed with the charge plan of Plan A illustrated in FIG. 3.

In some cases, multiple image forming apparatuses are installed in the same local area network (LAN), depending on the use environment of the client. In such cases, the use frequencies of the image forming apparatuses are not uniform, and only some image forming apparatuses may be used frequently. Consequently, only some image forming apparatuses may have a large number of notification events transmitted from the image forming apparatuses to the remote management server 60, and thus the following state is thus likely to occur. One of the image forming apparatuses frequently transmits a change of toner status information, failure information generation, and the like as the notification data to the remote management server 60, while a different one of the image forming apparatuses seldom transmits notification data to the remote management server 60.

In such a case, the following states are likely to occur. In a frequently used image forming apparatus, the cumulative traffic of notification data to the remote management server 60 exceeds the upper limit, and a charge for traffic over the monthly traffic is imposed. If communication over the upper limit is restrained, an event notification such as supply shortage or a failure occurrence is prevented from being transmitted to the remote management server 60, while a less frequently used image forming apparatus has a cumulative traffic below the upper limit to a larger extent.

Occurrences of the states as described above cause various issues from the overall system viewpoint, such as an unnecessary communication charge and restraint of transmission of notification data to be notified.

Hence, the remote management system of this exemplary embodiment performs control as below, and thereby data transmission to be performed over the upper limit for traffic is restrained as compared to a case where generated data is transmitted without considering the upper limit.

FIG. 4 illustrates a block diagram illustrating the hardware configuration of the image forming apparatuses 10A to 10C illustrated in FIG. 1. Each of the image forming apparatuses 10A to 10C has the same configuration and thus is hereinafter referred to as the image forming apparatus 10 when referring to the configuration of the image forming apparatuses 10A to 10C. Each of the LPWA communication modules 20A to 20C is likewise referred to as the LPWA communication module 20 in the description.

As illustrated in FIG. 4, the image forming apparatus 10 includes a central processing unit (CPU) 11, a memory 12, a memory device 13 such as a hard disk drive, a communication interface 14 that transmits and receives data to and from a different one of the image forming apparatuses 10 via a network 30, a user interface device 15 including a touch panel or a liquid crystal display together with a keyboard, a scanner 16, and a print engine 17. These components are connected to each other via a control bus 18. The LPWA communication module 20 is also connected to the components via the control bus 18.

The CPU 11 executes a predetermined process on the basis of a control program stored in the memory 12 or the memory device 13 and thereby controls the operation of the image forming apparatus 10. This exemplary embodiment is described on the assumption that the CPU 11 reads out and runs the control program stored in the memory 12 or the memory device 13; however, the program may be provided to the CPU 11 in such a manner as to be stored in a storage medium such as a compact disc read-only memory (CD-ROM).

Figure 5:
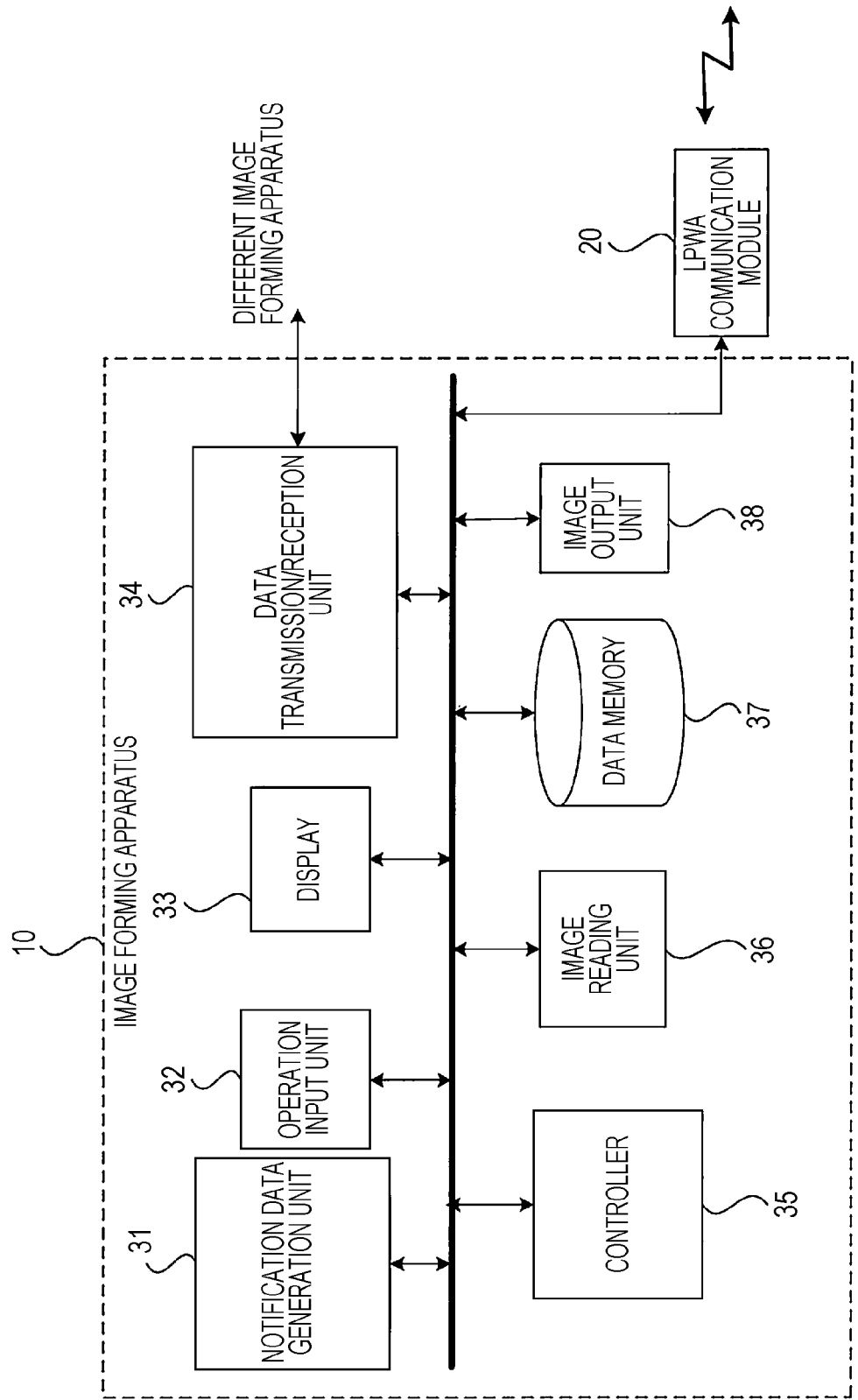
FIG. 5 is a block diagram illustrating the functional configuration of the image forming apparatus in the exemplary embodiment of the present disclosure.

FIG. 5 is a block diagram illustrating the functional configuration of the image forming apparatus 10 implemented by running the control program.

As illustrated in FIG. 5, the image forming apparatus 10 of this exemplary embodiment includes a notification data generation unit 31, an operation input unit 32, a display 33, a data transmission/reception unit 34, a controller 35, an image reading unit 36, a data memory 37, and an image output unit 38.

The operation input unit 32 inputs various operations performed by a user. The display 33 displays various pieces of information to the user.

The image reading unit 36 reads an image from a document that is set on the image forming apparatus 10. The image output unit 38 outputs an image to a recording medium such as a printing sheet.

The notification data generation unit 31 generates notification data to be notified to the remote management server 60. Specifically, when the toner cartridge of a specific color is to be evacuated soon due to a decrease in an amount of used toner, the notification data generation unit 31 generates notification data for notification of toner status information to the remote management server 60. In addition, in a configuration in which meter count information is regularly transmitted to the remote management server 60, the notification data generation unit 31 generates the meter count information every specified period.

The data transmission/reception unit 34 transmits and receives data to and from a different image forming apparatus via the network 30.

The data memory 37 stores cumulative traffic in a specified period in data communication with the remote management server 60 through a LPWA communication line. For example, in the case where the charge plan is based on a monthly traffic charge as described above, the data memory 37 stores cumulative traffic in one month. The cumulative traffic stored in the data memory 37 is thus reset at the beginning of every month.

The controller 35 transmits the notification data generated by the notification data generation unit 31 to the remote management server 60 via a different image forming apparatus if the sum of traffic for transmitting the notification data to the remote management server 60 and the cumulative traffic stored in the data memory 37 exceeds the predetermined upper limit.

Specifically, the controller 35 transmits the notification data generated by the notification data generation unit 31 from the LPWA communication module 20 to the remote management server 60. That is, the controller 35 transmits the notification data to the remote management server 60 via the LPWA network.

For example, in a case where the traffic of notification data intended to be transmitted is 0.02 KB when the current cumulative traffic is 9.99 KB, the sum of the cumulative traffic and the traffic of the notification data intended to be transmitted becomes 10.01 KB and exceeds an upper limit of 10 KB.

In such a case, the controller 35 searches for a different image forming apparatus that is to serve as a proxy and transmit the notification data. If an image forming apparatus that is to serve as the proxy and transmit the notification data is found, the controller 35 transmits the notification data to the remote management server 60 via the found image forming apparatus.

Note that transmission of notification data of a specific image forming apparatus to the remote management server 60 via a different image forming apparatus is referred to as proxy transmission. The term "proxy transmission" thus denotes transmission to the remote management server 60 performed by the different image forming apparatus serving as a proxy, the transmission otherwise being performed of notification data to be directly transmitted the remote management server 60 from the specific image forming apparatus.

If the sum of the cumulative traffic and the traffic of notification data intended to be transmitted exceeds the upper limit in a specific image forming apparatus, it is possible that multiple image forming apparatuses available for the proxy transmission are present on the same network or no image forming apparatus available for the proxy transmission is present.

Hence, if the sum of the traffic for transmitting notification data generated by the notification data generation unit 31 to the remote management server 60 and the cumulative traffic stored in the data memory 37 exceeds the predetermined upper limit, the controller 35 searches for a different image forming apparatus available for transmission of the notification data to the remote management server 60. Specifically, the controller 35 searches for the different image forming apparatus available for the proxy transmission in such a manner as to cause the data transmission/reception unit 34 to transmit and receive data to and from different image forming apparatuses via the network 30.

Specifically, the controller 35 performs broadcast transmission of a packet for searching for an image forming apparatus available for the proxy transmission from the data transmission/reception unit 34 to the network 30. If a value of the sum of the cumulative traffic of a different image forming apparatus receiving the packet transmitted through the broadcasting and the traffic of the notification data to undergo the requested proxy transmission does not exceed the upper limit of the different image forming apparatus, the different image forming apparatus makes a reply to the image forming apparatus having transmitted the packet for searching for an image forming apparatus available for proxy transmission. The reply indicates that the proxy transmission is executable.

If a different image forming apparatus available for transmission of the notification data to the remote management server 60 is found as the result of the searching as described above, the controller 35 requests the different image forming apparatus to perform the proxy transmission and thereby transmits the notification data to the remote management server 60 via the different image forming apparatus.

If multiple image forming apparatuses make a reply indicating that the proxy transmission is executable, the controller 35 may request the image forming apparatus having the largest difference between the upper limit and the cumulative traffic, that is, may request the image forming apparatus having the largest room left to reach the upper limit to perform the proxy transmission.

When searching for an image forming apparatus available for the proxy transmission, the controller 35 may inquire whether the proxy transmission is executable by using a list, instead of performing the broadcasting of the packet for searching for an image forming apparatus available for the proxy transmission as described above. Specifically, a list of candidate image forming apparatuses for proxy transmission is registered in advance in each image forming apparatus or in a specific server, and an inquiry is made in the order from the top of the list of the registered image forming apparatuses.

When receiving, from a different image forming apparatus, notification data for requested transmission to the remote management server 60, the controller 35 of a specific image forming apparatus performs the proxy transmission of the received notification data to the remote management server 60 as the notification data of the different image forming apparatus, not as the notification data of the specific image forming apparatus.

Further, the data memory 37 stores therein determination information indicating whether proxy transmission is permitted for each type of notification data.

If the data type of notification data generated by the notification data generation unit 31 is a data type set not to permit proxy transmission in the determination information stored in the data memory 37, and if the sum of the traffic for transmitting the generated notification data to the remote management server 60 and the cumulative traffic stored in the data memory 37 exceeds the predetermined upper limit, the controller 35 does not perform the proxy transmission of the notification data to the remote management server 60. Specifically, if the sum of the traffic of the notification data and the cumulative traffic exceeds the upper limit, but if the data type of the notification data is the data type set not to permit proxy transmission, the controller 35 does not request a different image forming apparatus to perform the proxy transmission.

The determination information stored in the data memory 37 includes information indicating whether data transmission to be performed over the upper limit (also referred to as over-limit data transmission) is permitted for each type of data.

If the sum of the traffic for transmitting the generated data to the remote management server 60 and the cumulative traffic stored in the data memory 37 exceeds the predetermined upper limit, but if the data type of the notification data generated by the notification data generation unit 31 is the data type set not to permit the proxy transmission in the determination information stored in the data memory 37 and is also a data type set to permit the over-limit data transmission, the controller 35 directly transmits the notification data to the remote management server 60.

If notification data is not transmitted to the remote management server 60 because the data type of the notification data generated by the notification data generation unit 31 is a data type set not to permit both of the proxy transmission and the over-limit data transmission in the determination information stored in the data memory 37, the controller 35 may transmit the notification data to the remote management server 60 in the next specified period following the end of the current specified period.

Specifically, if the data type of the notification data is the data type set not to permit both of the proxy transmission and the over-limit transmission, and if the sum of traffic projected as traffic for the transmission and cumulative traffic exceeds the upper limit, the notification data is prevented from being transmitted to the remote management server 60. Accordingly, if the notification data is prevented from being transmitted in the specified period that is a monthly period, the controller 35 transmits the notification data to the remote management server 60 next month.

FIG. 6 illustrates a control table that is an example of the determination information stored in the data memory 37. The control table illustrated in FIG. 6 is an example of the determination information as described above, and it is understood that whether proxy transmission is executable and whether over-limit transmission is executable for each notification data type such as the meter count information and the toner status information.

For example, the meter count information is information of importance used for charging a client or the like, and thus over-limit transmission is permitted for the meter count information. However, the meter count information is set not to permit proxy transmission to reduce risk of spoofing.

An error occurrence status notification is urgent and is thus set to permit both of proxy transmission and over-limit transmission.

The toner status information is low urgency information in the remote management and is thus set to permit proxy transmission but not to permit over-limit transmission.

Note that the controller 35 has a function enabling an electronic signature to be added to notification data generated by the notification data generation unit 31.

The data memory 37 also stores therein not only the determination information described above but also determination information indicating whether to add an electronic signature for each notification data type.

If the sum of traffic for transmitting notification data generated by the notification data generation unit 31 to the remote management server 60 and cumulative traffic exceeds the predetermined upper limit, and if the data type of the generated data is a data type set to add an electronic signature in the determination information stored in the data memory 37, the controller 35 adds the electronic signature to the notification data and transmits the notification data with the electronic signature added thereto to the remote management server 60 via a different image forming apparatus.

FIG. 7 illustrates an example control table in which whether to add an electronic signature is set for each notification data type as described above.

The control table illustrated in FIG. 7 is an example of the determination information as described above, and it is understood that whether to add an electronic signature in addition to whether proxy transmission is permitted and whether over-limit transmission is permitted is set for each notification data type such as the meter count information and the toner status information.

If an electronic signature is added to notification data, the absence of spoofing or manipulation may be guaranteed. That is, if notification data is transmitted through proxy transmission, but if an electronic signature is added to the notification data, the remote management server 60 may verify the transmission source of the notification data.

However, since the traffic of the notification data with the electronic signature added thereto is increased compared with a case where the electronic signature is not added, an electronic signature is added to only notification data of importance as illustrated in FIG. 7. For example, an electronic signature is added to only the meter count information that is information of importance.

The meter count information is information of importance and is thus set not to permit proxy transmission in the control table illustrated in FIG. 6. However, the security is improved by adding an electronic signature, and thus the meter count information is set to permit proxy transmission in the control table illustrated in FIG. 7. It is thus understood that the meter count information is set to permit proxy transmission on condition that an electronic signature is added.

Suppose a case where the meter count information is transmitted to the remote management server 60 only once a month on the closing date. If cumulative traffic reaches the upper limit before the closing date, transmitting the meter count information to the remote management server 60 is likely to cause the cumulative traffic to exceed the upper limit.

Accordingly, traffic needed for the notification of the meter count information is subtracted in advance from the upper limit, and the resultant value is managed as a new upper limit. The management prevents the exceeding of the cumulative traffic over the upper limit caused by the transmission of the meter count information on the closing date.

Specifically, the data memory 37 stores therein the cumulative traffic accumulated not to include traffic for transmitting, to the remote management server 60, specific data such as the meter count information decided to be transmitted to the remote management server 60 in the specified period.

The controller 35 changes the determination of whether to transmit data generated by the notification data generation unit 31 to the remote management server 60 via a different image forming apparatus, depending on the new upper limit value. The new upper limit is obtained by subtracting traffic for transmitting specific data such as the meter count information to the remote management server 60 from the predetermined upper limit.

Figure 8:
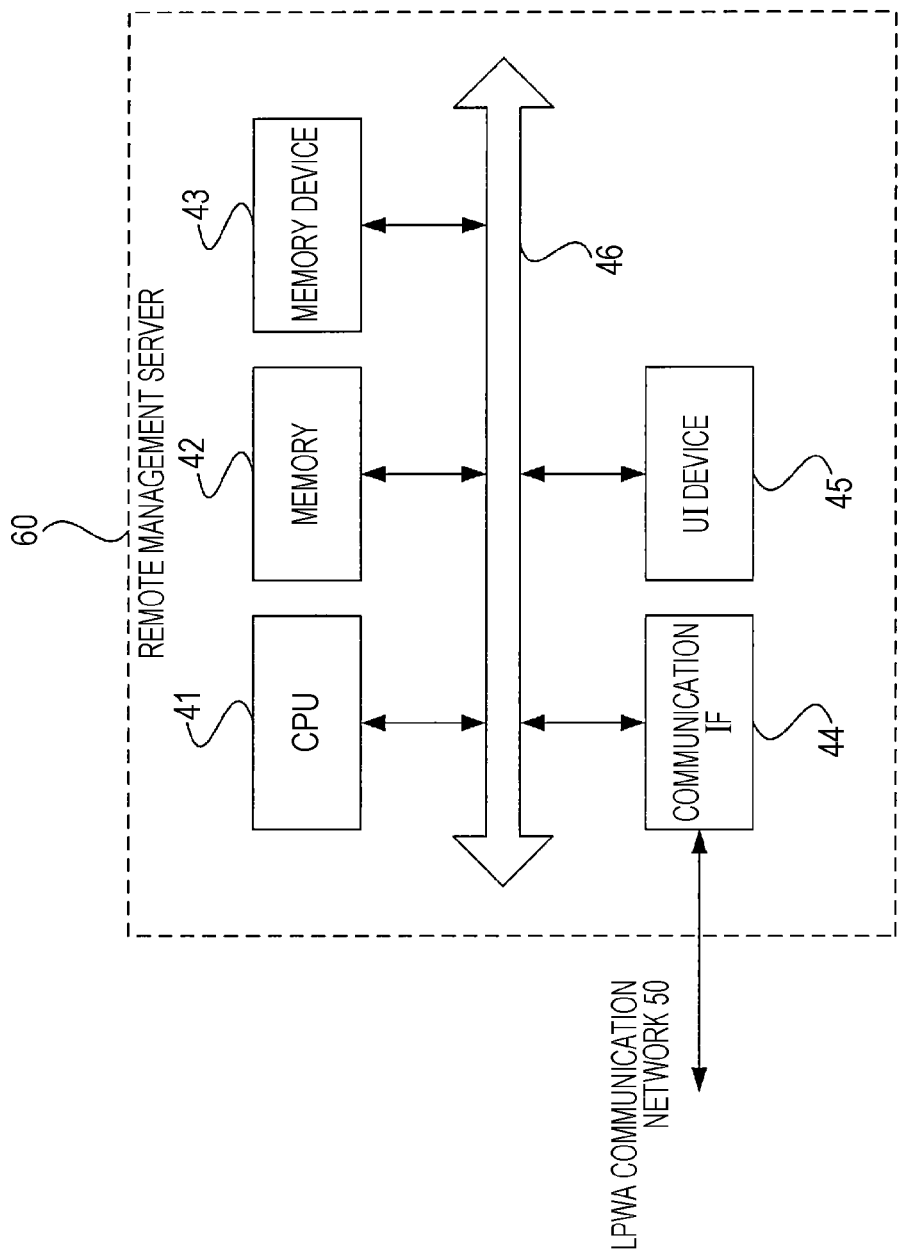
FIG. 8 is a block diagram illustrating the hardware configuration of the remote management server in the exemplary embodiment of the present disclosure.

FIG. 8 illustrates the hardware configuration of the remote management server 60 illustrated in FIG. 1.

As illustrated in FIG. 8, the remote management server 60 includes a CPU 41, a memory 42, a memory device 43 such as a hard disk drive, a communication interface 44 that transmits and receives data to and from the image forming apparatuses 10 via the LPWA communication network 50, and a user interface device 45 including a touch panel or a liquid crystal display together with a keyboard. These components are connected to each other via a control bus 46.

The CPU 41 executes a predetermined process on the basis of a control program stored in the memory 42 or the memory device 43 and thereby controls the operation of the remote management server 60. This exemplary embodiment is described on the assumption that the CPU 41 reads out and runs the control program stored in the memory 42 or the memory device 43; however, the program may be provided to the CPU 41 in such a manner as to be stored in a storage medium such as a CD-ROM.

Figure 9:
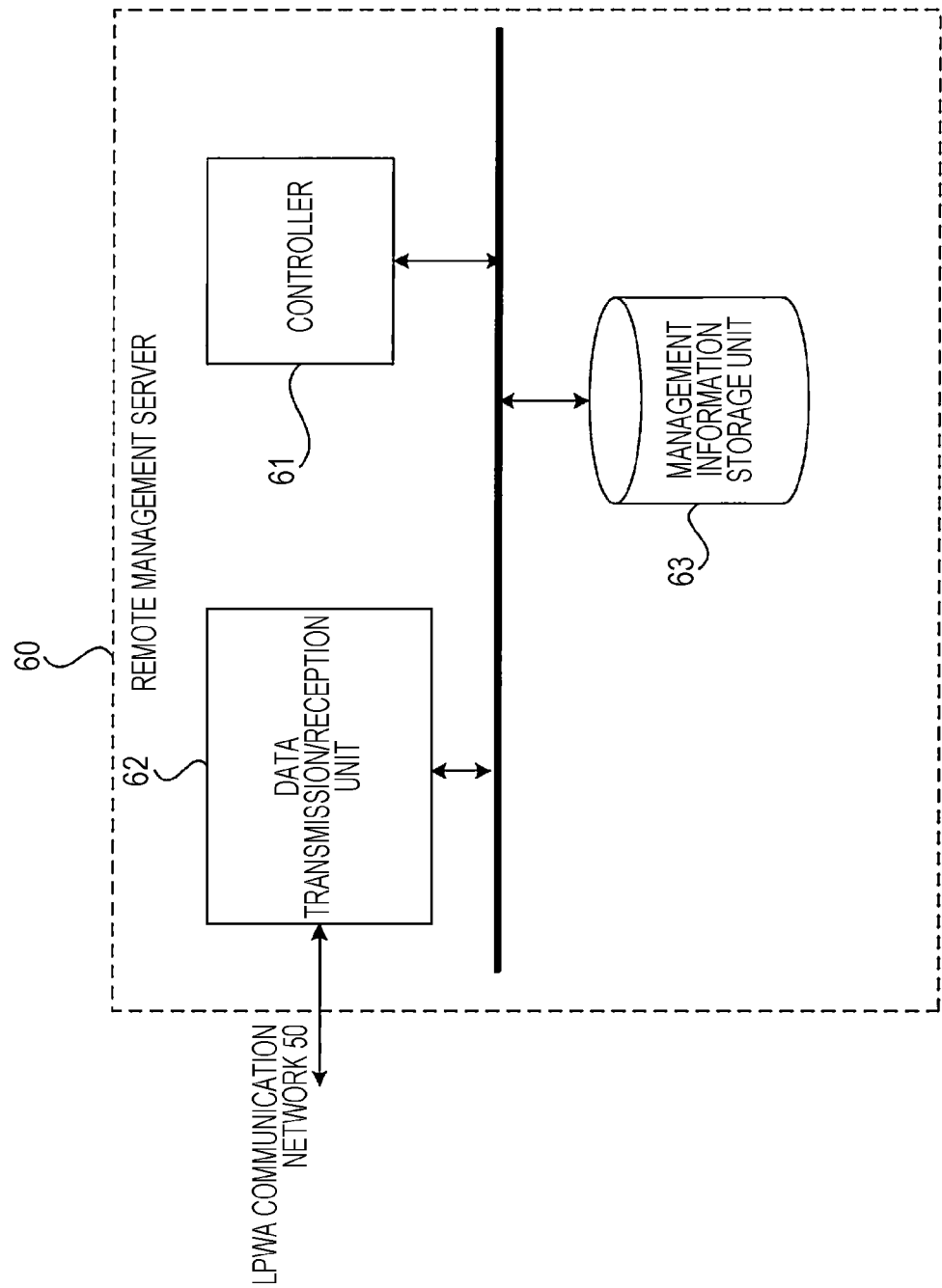
FIG. 9 is a block diagram illustrating the functional configuration of the remote management server in the exemplary embodiment of the present disclosure.

FIG. 9 is a block diagram illustrating the functional configuration of the remote management server 60 implemented by running the control program.

As illustrated in FIG. 9, the remote management server 60 includes a controller 61, a data transmission/reception unit 62, and a management information storage unit 63.

The management information storage unit 63 stores therein data indicating the states of the multiple image forming apparatuses 10 as the management information.

After the data transmission/reception unit 62 receives notification data from any of the image forming apparatuses 10 via the LPWA communication network 50, the controller 61 stores information included in the notification data received by the data transmission/reception unit 62 as the management information in the management information storage unit 63.

Since notification data is serially transmitted from the multiple image forming apparatuses 10, the controller 61 updates the management information stored in the management information storage unit 63 on the basis of the notification data transmitted from the multiple image forming apparatuses 10.

If notification data transmitted from a specific image forming apparatus 10 is notification data transmitted in response to a request from a different image forming apparatus 10, and if the client identification information of the different image forming apparatus 10 having transmitted the notification data is identical to the client identification information of the different image forming apparatus 10 having requested the specific image forming apparatus 10 to transmit the data, the controller 61 updates the management information stored in the management information storage unit 63 on the basis of the transmitted notification data.

The operation of each image forming apparatus 10 in the remote management system of this exemplary embodiment will be described in detail with reference to the drawings.

Figure 10:
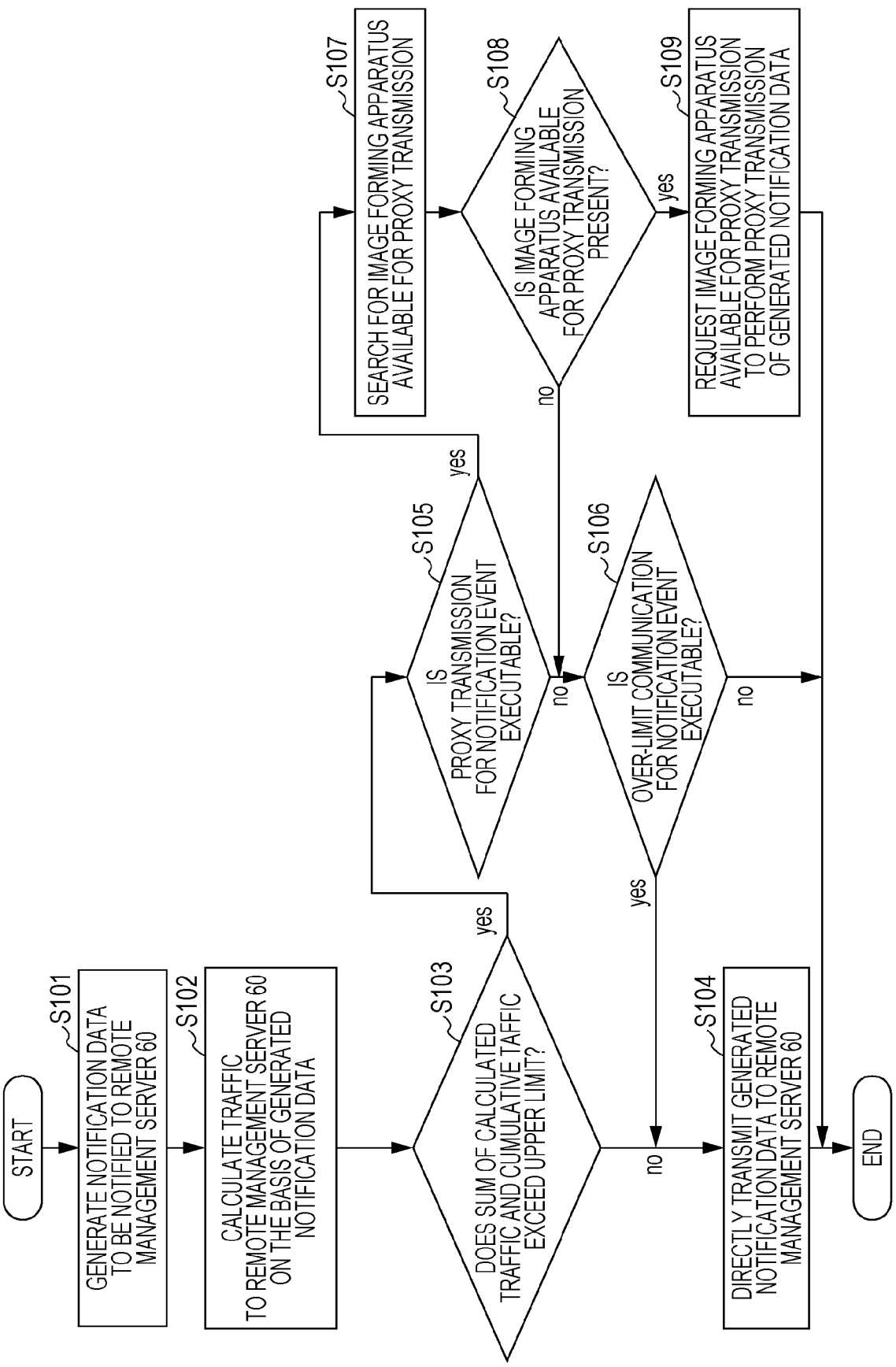
FIG. 10 is a flowchart for explaining operations performed when a notification event occurs in the image forming apparatus of the exemplary embodiment of the present disclosure.

First, operations performed when a notification event occurs in the image forming apparatus 10 will be described with reference to a flowchart in FIG. 10.

When an event to be notified to the remote management server 60 occurs in the image forming apparatus 10, the notification data generation unit 31 generates notification data to be notified to the remote management server 60, in step S101.

In step S102, the controller 35 calculates traffic needed to transmit the notification data generated by the notification data generation unit 31 to the remote management server 60.

In step S103, the controller 35 calculates the sum of the calculated traffic and the cumulative traffic stored in the data memory 37 and determines whether the sum exceeds the upper limit.

If the sum of the calculated traffic and the cumulative traffic does not exceed the upper limit in step S103, the controller 35 directly transmits the generated notification data to the remote management server 60 in step S104.

For example, when an event that is LOW as the Y toner status occurs in the image forming apparatus 10A, the notification data as illustrated in FIG. 11 is generated in the image forming apparatus 10A.

The notification data is composed of apparatus identification information regarding the image forming apparatus 10A, a notification data type indicating Y TONER STATUS, a notification data length, and notification data indicating LOW. The notification data is 20-byte data.

The controller 35 of the image forming apparatus 10A calculates traffic for transmitting the notification data to the remote management server 60. As the traffic for transmitting the 20-byte notification data, traffic including a header length to be added in a lower layer and the length of a reply packet from the remote management server 60 needs to be calculated. The controller 35 thus calculates total traffic needed for transmitting the generated notification data to the remote management server 60.

If the sum of the calculated traffic and the cumulative traffic does not exceed the upper limit, the controller 35 directly transmits the notification data illustrated in FIG. 11 to the remote management server 60.

However, if the sum of the calculated traffic and the cumulative traffic exceeds the upper limit in step S103, the controller 35 does not transmit the generated notification data. In step S105, the controller 35 determines whether proxy transmission is executable for the notification event on the basis of the control table illustrated in FIG. 6.

For example, if the current cumulative traffic in the image forming apparatus 10A is 9.99 KB, and if traffic for transmitting the notification data illustrated in FIG. 11 is 50 B, the sum is 10.04 KB and exceeds the upper limit that is 10 KB for Plan A as a charge plan.

Note that if the notification event is a notification event set not to permit proxy transmission, the controller 35 determines in step S106 whether the notification event is a notification event set to permit over-limit communication.

If the notification event is a notification event set to permit over-limit communication, the controller 35 transmits the generated notification data to the remote management server 60 in step S104.

If the notification event is a notification event set not to permit over-limit communication, the controller 35 does not transmit the generated notification data and terminates the process.

If the notification event is a notification event set to permit proxy transmission in step S105, the controller 35 performs broadcast transmission of a packet for searching for an image forming apparatus available for proxy transmission from the data transmission/reception unit 34 to the network 30 in step S107.

Description is provided on the assumption that, for example, the current cumulative traffic of the image forming apparatus 10B is 1 KB, and even if proxy transmission requested from the image forming apparatus 10A is performed of notification data, the cumulative traffic does not exceed the upper limit of 10 KB. In this case, upon receiving the packet transmitted through the broadcasting from the image forming apparatus 10A, the image forming apparatus 10B makes a reply indicating that the proxy transmission is executable.

The controller 35 of the image forming apparatus 10A receives the reply indicating that the proxy transmission is executable from the image forming apparatus 10B. In step S108, the controller 35 determines that an image forming apparatus 10 available for the proxy transmission is present. In step S109, the controller 35 of the image forming apparatus 10A requests the image forming apparatus 10B to perform the proxy transmission of the notification data.

Note that if a reply indicating that proxy transmission is executable is not received from any of the image forming apparatuses 10, the controller 35 of the image forming apparatus 10A determines in step S108 that an image forming apparatus 10 available for proxy transmission is not present. In step S106, the controller 35 determines whether the notification event is a notification event set to permit over-limit communication and executes the same step as described above on the basis of the determination result.

The image forming apparatus 10B receiving the request for the proxy transmission from the image forming apparatus 10A generates the 39-byte notification data illustrated in FIG. 12 including the notification data from the image forming apparatus 10A and transmits the generated notification data to the remote management server 60.

In the example notification data illustrated in FIG. 12, apparatus identification information regarding the image forming apparatus 10B, the notification data type that is proxy transmission, and a notification data length are added to the notification data of the image forming apparatus 10A illustrated in FIG. 11.

On the basis of the apparatus identification information regarding the image forming apparatus 10A that is originally to transmit the notification data and the apparatus identification information regarding the image forming apparatus 10B serving as a proxy, the remote management server 60 receiving the notification data illustrated in FIG. 11 verifies that the pieces of client identification information regarding the respective image forming apparatuses 10A and 10B match in the management information illustrated in FIG. 2. The remote management server 60 updates the Y toner information of the image forming apparatus 10A from AVAILABLE to LOW.

The toner status information is low urgency information in the remote management and is thus set not to permit over-limit transmission. Accordingly, all of the other image forming apparatuses 10 including the image forming apparatus 10B have the cumulative traffic close to the upper limit of 10 KB, such notification data as the toner status information is not transmitted to the remote management server 60. Such notification data is transmitted to the remote management server 60 next month after the cumulative traffic is cleared.

Figure 13:
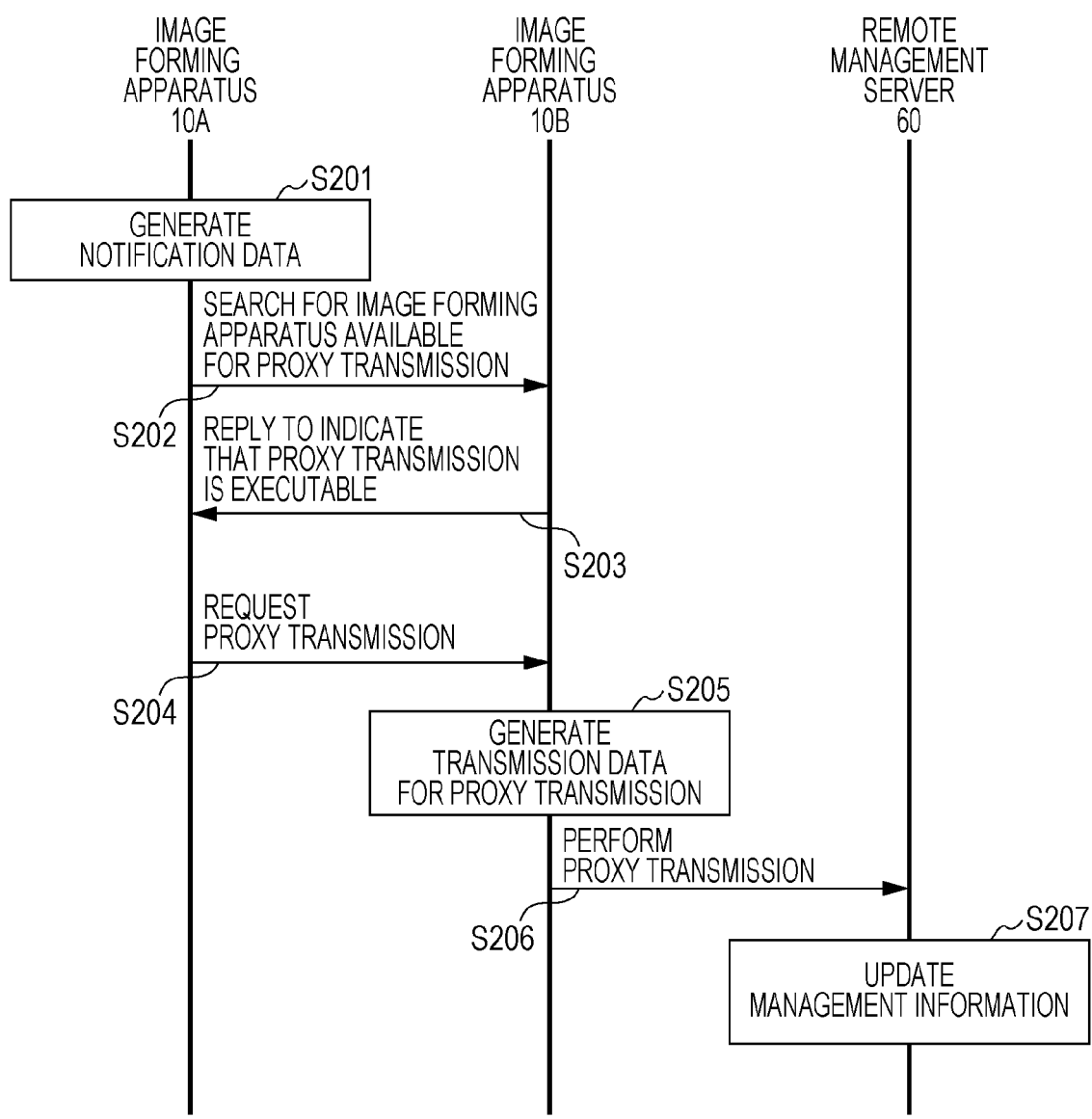
FIG. 13 is a sequence chart for explaining how data is transmitted and received among the image forming apparatuses and the remote management server.

Lastly, how data is transmitted and received among the image forming apparatuses 10A and 10B and the remote management server 60 as described above will be described by using a sequence chart in FIG. 13.

First, in step S201, the image forming apparatus 10A generates notification data to be transmitted to the remote management server 60. Since transmitting the notification data leads to excess of the cumulative traffic in the current month over the upper limit, the image forming apparatus 10A searches in step S202 for an image forming apparatus available for proxy transmission.

In step S203, the image forming apparatus 10B makes a reply indicating that the proxy transmission is executable to the image forming apparatus 10A.

In step S204, the image forming apparatus 10A requests the image forming apparatus 10B to perform the proxy transmission of the notification data to the remote management server 60.

As the result, in step S205, the image forming apparatus 10B generates notification data for the proxy transmission as illustrated in FIG. 12.

In step S206, the image forming apparatus 10B serves as a proxy and transmits the generated notification data for the proxy transmission to the remote management server 60.

In step S207, the remote management server 60 receiving the notification data from the image forming apparatus 10B through the proxy transmission updates stored management information on the basis of the content of the notification data.

Modification

The exemplary embodiment has heretofore been described by using the case where the management information of the image forming apparatuses is acquired and managed by the remote management server; however, the present disclosure is not limited to this exemplary embodiment. The present disclosure is also applicable to a case where the management information of an information processing apparatus other than the image forming apparatus is acquired and managed by a management apparatus such as the remote management server.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An image forming apparatus comprising:
   a hardware processor coupled to a transceiver and a memory, wherein the hardware processor is configured at least to:
      generate data to be notified to a management apparatus;
      transmit, by using the transceiver, the data which is generated to the management apparatus: and
      store by using the memory the data after the data is generated,
      wherein the hardware processor is farther configured to:
         determine whether a sum of a total data which comprises the data generated to be notified to the management apparatus and the data that has been transmitted to the management apparatus within a specific period has exceeded a predetermined upper limit, and
   transmit an additional data to the management apparatus via another image forming apparatus which is the same as the image forming apparatus if the sum of the total data transmitted to the management apparatus is determined by the hardware processor to have exceeded the predetermined upper limit.

2. The image forming apparatus according to claim 1, wherein the hardware processor is further configured to:
   perform searching for another image forming apparatus available for transmission of the data generated by the hardware processor to the management apparatus, the searching being performed if the sum of the traffic for transmitting the data to the management apparatus and the cumulative traffic stored in the memory exceeds the predetermined upper limit,
   wherein if the another image forming apparatus available for the transmission of the data to the management apparatus is found as a result of the searching performed by the hardware processor, the transceiver transmits the data to the management apparatus via the another image forming apparatus.

3. The image forming apparatus according to claim 1,
   wherein if the transceiver receives, from the another image forming apparatus, data for requested transmission to the management apparatus, the transceiver transmits the received data as data of the another image forming apparatus to the management apparatus.

4. The image forming apparatus according to claim 2,
   wherein if the transceiver receives, from the another image forming apparatus, data for requested transmission to the management apparatus, the transceiver transmits the received data as data of the another image forming apparatus to the management apparatus.

5. The image forming apparatus according to claim 1,
   wherein the memory stores determination information indicating whether transmission to the management apparatus via another image forming apparatus is permitted on a per data type basis, and
   wherein if a data type of the data generated by the hardware processor is a data type set not to permit transmission to the management apparatus via another image forming apparatus in the determination information stored in the memory, and if the sum of the traffic for transmitting the data generated by the hardware processor to the management apparatus and the cumulative traffic stored in the memory exceeds the predetermined upper limit, the transceiver does not transmit the data to the management apparatus via the another image forming apparatus.

6. The image forming apparatus according to claim 2,
   wherein the memory stores determination information indicating whether transmission to the management apparatus via another image forming apparatus is permitted on a per data type basis, and
   wherein if a data type of the data generated by the hardware processor is a data type set not to permit transmission to the management apparatus via another image forming apparatus in the determination information stored in the memory, and if the sum of the traffic for transmitting the data generated by the hardware processor to the management apparatus and the cumulative traffic stored in the memory exceeds the predetermined upper limit, the transceiver does not transmit the data to the management apparatus via the different apparatus.

7. The image forming apparatus according to claim 3,
   wherein the memory stores determination information indicating whether transmission to the management apparatus via another image forming apparatus is permitted on a per data type basis, and
   wherein if a data type of the data generated by the hardware processor is a data type set not to permit transmission to the management apparatus via another image forming apparatus in the determination information stored in the memory, and if the sum of the traffic for transmitting the data generated by the hardware processor to the management apparatus and the cumulative traffic stored in the memory exceeds the predetermined upper limit, the transceiver does not transmit the data to the management apparatus via the different apparatus.

8. The image forming apparatus according to claim 4,
   wherein the memory stores determination information indicating whether transmission to the management apparatus via another image forming apparatus is permitted on a per data type basis, and
   wherein if a data type of the data generated by the hardware processor is a data type set not to permit transmission to the management apparatus via another image forming apparatus in the determination information stored in the memory, and if the sum of the traffic for transmitting the data generated by the hardware processor to the management apparatus and the cumulative traffic stored in the memory exceeds the predetermined upper limit, the transceiver does not transmit the data to the management apparatus via the different apparatus.

9. The image forming apparatus according to claim 5,
wherein the determination information includes information indicating whether transmission to be performed over the upper limit is permitted on the per data type basis, and
wherein if the sum of the traffic for transmitting the data generated by the hardware processor to the management apparatus and the cumulative traffic stored in the memory exceeds the predetermined upper limit, but if the data type of the data generated by the hardware processor is a data type set to permit transmission to be performed over the upper limit in the determination information stored in the memory, the transceiver directly transmits the data to the management apparatus.

10. The image forming apparatus according to claim 9,
wherein if data generated by the hardware processor is not transmitted to the management apparatus because a data type of the data is a data type set not to permit transmission to be performed over the upper limit in the determination information stored in the memory, the transceiver transmits the data to the management apparatus in a specified period following end of a current specified period.

11. The image forming apparatus according to claim 1, wherein the hardware processor is further configured to:
add an electronic signature to the data generated by the hardware processor,
wherein the memory stores determination information indicating whether to add the electronic signature on a per data type basis, and
wherein if the sum of the traffic for transmitting the data generated by the hardware processor to the management apparatus and the cumulative traffic stored in the memory exceeds the predetermined upper limit, and if a data type of the data generated by the hardware processor is a data type set to add an electronic signature in the determination information stored in the memory, the transceiver transmits, to the management apparatus via the another image forming apparatus, the data with the electronic signature added by the hardware processor.

12. The image forming apparatus according to claim 2, wherein the hardware processor is further configured to:
add an electronic signature to the data generated by the hardware processor,
wherein the memory stores determination information indicating whether to add the electronic signature on a per data type basis, and
wherein if the sum of the traffic for transmitting the data generated by the hardware processor to the management apparatus and the cumulative traffic stored in the memory exceeds the predetermined upper limit, and if a data type of the data generated by the hardware processor is a data type set to add an electronic signature in the determination information stored in the memory, the transceiver transmits, to the management apparatus via the another image forming apparatus, the data with the electronic signature added by the hardware processor.

13. The image forming apparatus according to claim 3, wherein the hardware processor is further configured to further comprising:
add an electronic signature to the data generated by the hardware processor,
wherein the memory stores determination information indicating whether to add the electronic signature on a per data type basis, and
wherein if the sum of the traffic for transmitting the data generated by the hardware processor to the management apparatus and the cumulative traffic stored in the memory exceeds the predetermined upper limit, and if a data type of the data generated by the hardware processor is a data type set to add an electronic signature in the determination information stored in the memory, the transceiver transmits, to the management apparatus via the another image forming apparatus, the data with the electronic signature added by the hardware processor.

14. The image forming apparatus according to claim 4, wherein the hardware processor is further configured to:
add an electronic signature to the data generated by the hardware processor,
wherein the memory stores determination information indicating whether to add the electronic signature on a per data type basis, and
wherein if the sum of the traffic for transmitting the data generated by the hardware processor to the management apparatus and the cumulative traffic stored in the memory exceeds the predetermined upper limit, and if a data type of the data generated by the hardware processor is a data type set to add an electronic signature in the determination information stored in the memory, the transceiver transmits, to the management apparatus via the another image forming apparatus, the data with the electronic signature added by the hardware processor.

15. The image forming apparatus according to claim 1,
wherein the memory stores the cumulative traffic accumulated not to include traffic for transmitting specific data to the management apparatus, the specific data being decided to be transmitted to the management apparatus in the specified period, and
wherein the transceiver changes determination of whether to transmit the data generated by the hardware processor to the management apparatus via the another image forming apparatus, depending on a new upper limit obtained by subtracting the traffic for transmitting the specific data to the management apparatus from the predetermined upper limit.

16. The image forming apparatus according to claim 1, wherein the transceiver transmits data to the management apparatus via a wireless communication network.

17. An image forming system comprising:
a plurality of image forming apparatuses; and
a management apparatus,
the plurality of image forming apparatuses each including a hardware processor, wherein the hardware processor is coupled to a transceiver and a memory, wherein the hardware processor is configured at least to:
generate data to be notified to the management apparatus;
transmit, by using the transceiver, the data which is generated to the management apparatus; and store by using the memory the data after the data is generated;

wherein the hardware processor is further configured to:

determine whether a sum of a total data which comprises the data generated to be notified to the management apparatus and the data that has been transmitted to the management apparatus within a specific period has exceeded a predetermined upper limit, and transmit an additional data to the management apparatus via another one of the plurality of image forming apparatuses if the sum of the total data transmitted to the management apparatus is determined by the hardware processor to have exceeded the predetermined upper limit, the management apparatus including a storage unit and an update unit, the storage unit storing data indicating a status of each of the plurality of image forming apparatuses, the update unit updating the data stored in the storage unit on a basis of the data transmitted from each of the plurality of image forming apparatuses.

18. The image forming system according to claim 17, wherein if data transmitted from a first image forming apparatus of the plurality of image forming apparatuses is data transmitted in response to a request from a second image forming apparatus of the plurality of image forming apparatuses, and if client identification information of the first image forming apparatus that transmits the data is identical to client identification information of the second image forming apparatus that requests the first image forming apparatus to transmit the data, the update unit updates the data stored in the storage unit on a basis of the transmitted data.

19. A non-transitory computer readable medium storing a program causing an image forming apparatus to execute a process, the process comprising:

storing cumulative traffic in a specified period in data communication with a management apparatus;

generating data to be notified to the management apparatus;

determining whether a sum of a total data which comprises the data generated to be notified to the management apparatus and the data that has been transmitted to the management apparatus within a specific period has exceeded a predetermined upper limit, and transmitting an additional data to the management apparatus via another image forming apparatus which is the same as the image forming apparatus if the sum of the total data transmitted to the management apparatus is determined to have exceeded the predetermined upper limit.

* * * * *